United States Patent
Wagner et al.

(10) Patent No.: US 8,548,016 B2
(45) Date of Patent: Oct. 1, 2013

(54) TUNABLE LASER SYSTEM HAVING FINE AND COARSE WAVELENGTH DISCRIMINATION

(75) Inventors: Chris Wagner, Ottawa (CA); Grant Tessaro, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/598,666

(22) Filed: Aug. 30, 2012

(65) Prior Publication Data

US 2013/0058365 A1    Mar. 7, 2013

Related U.S. Application Data

(60) Provisional application No. 61/529,953, filed on Sep. 1, 2011.

(51) Int. Cl.
*H01S 3/10* (2006.01)

(52) U.S. Cl.
USPC ......... 372/20; 372/9; 372/25; 372/30; 372/33

(58) Field of Classification Search
USPC .......................................... 372/9, 20, 25, 30
See application file for complete search history.

(56) References Cited

U.S. PATENT DOCUMENTS

| | | | |
|---|---|---|---|
| 5,896,193 A | 4/1999 | Colbourne et al. | 356/124 |
| 6,061,124 A | 5/2000 | Nyman et al. | 356/124 |
| 6,359,685 B1 | 3/2002 | Colbourne et al. | 356/124 |
| 6,795,196 B2 | 9/2004 | Funakawa | 356/450 |
| 7,079,253 B2 | 7/2006 | North-Morris et al. | 356/454 |
| 7,835,009 B2 | 11/2010 | Minneman et al. | 356/477 |
| 2005/0025198 A1* | 2/2005 | North-Morris et al. | 372/20 |
| 2006/0215167 A1* | 9/2006 | O'Gorman et al. | 356/454 |
| 2006/0239306 A1* | 10/2006 | Donohoe et al. | 372/20 |
| 2006/0274798 A1 | 12/2006 | Pritchett et al. | 372/38.01 |
| 2012/0002212 A1* | 1/2012 | Chandler et al. | 356/454 |

* cited by examiner

*Primary Examiner* — Dung Nguyen
(74) *Attorney, Agent, or Firm* — Teitelbaum & MacLean; Neil Teitelbaum; Doug MacLean (57) ABSTRACT

A tunable laser system having fine and coarse wavelength discrimination is provided. The tunable laser system includes a first filter having a first free spectral range (FSR) and a second filter having a second FSR different from the first FSR. The first filter provides a first series of pulses from a first portion of a laser output, and a second filter provides a second series of pulses from a second portion of the laser output. A processing system compares the first series of pulses and the second series of pulses to identify a series of markers, in which the markers are separated by a beat period of the first series of pulses and the second series of pulses. Advantageously, the series of markers may be used for mode-hop detection and/or for wavelength referencing.

22 Claims, 5 Drawing Sheets

TUNABLE LASER SYSTEM HAVING FINE AND COARSE WAVELENGTH DISCRIMINATION

CROSS-REFERENCE TO RELATED APPLICATIONS

This application claims priority from U.S. Provisional Patent Application No. 61/529,953 to Wagner et al. filed on Sep. 1, 2011, which is incorporated herein by reference.

TECHNICAL FIELD OF THE INVENTION

The present invention relates to a tunable laser system having fine and coarse wavelength discrimination. The present invention also relates to a tunable laser system including two filters.

BACKGROUND OF THE INVENTION

Tunable laser systems are used to measure wavelength-dependent characteristics in a variety of test applications. For example, a tunable laser system may be used to make wavelength-dependent loss or dispersion measurements on a device under test (DUT), such as an optical component. To attain higher measurement speeds, the laser output of the tunable laser is generally swept over a wavelength range. In each sweep, the wavelength of the laser output varies as a function of time between a start wavelength and a stop wavelength in the wavelength range.

A conventional tunable laser system, typically, includes a single short-period filter, such as a fiber etalon. The filter provides a series of pulses from a portion of the laser output, in which the pulses are separated in wavelength by the free spectral range (FSR) of the filter. In order to determine the instantaneous wavelength of the laser output, the pulses in the series of pulses are counted. Thus, the series of pulses provides fine wavelength discrimination at a wavelength resolution determined by the FSR of the filter.

However, the starting wavelength accuracy of the tunable laser is, generally, much lower than the wavelength resolution. In other words, the tunable laser cannot reliably begin a sweep at a start wavelength within a period of the filter. Therefore, a pulse count only provides the relative wavelength of the laser output at a particular point in time. To determine the absolute wavelength of the laser output at the particular point in time, the pulse count must be related to a wavelength reference. Typically, one or more reference lines from a reference cell, e.g., a gas absorption cell, are used for wavelength referencing. Unfortunately, the reference lines provided by a reference cell are, generally, limited in number and in wavelength.

Furthermore, determining the instantaneous wavelength of the laser output by counting the pulses in the series of pulses is only accurate if the wavelength of the laser output varies continuously over the wavelength range. However, the tunable laser, especially near the end of its life, may undergo one or more mode hops during a sweep. When a mode hop occurs, the wavelength of the laser output jumps by a wavelength interval that is a function of the cavity length of the tunable laser. Unfortunately, since the series of pulses provided by the filter is periodic in wavelength, the conventional tunable laser system cannot detect such a wavelength discontinuity.

In attempts to overcome these problems, tunable laser systems including a long-period filter, in addition to a short-period filter, have been developed. A series of pulses provided by the short-period filter provides fine wavelength discrimination, and a series of pulses provided by the long-period filter provides coarse wavelength discrimination. As described in U.S. Pat. No. 6,795,196, issued on Sep. 21, 2004 to Funakawa, which is incorporated herein by reference, the series of pulses provided by the long-period filter may be used for wavelength referencing. As described in U.S. Pat. No. 7,079,253, issued on Jul. 18, 2006 to North-Morris, et al., which is incorporated herein by reference, the series of pulses provided by the long-period filter may be used for mode-hop detection.

However, in general, the short-period filter and the long-period filter in these tunable laser systems are different types of filter. For example, the short-period filter may be a fiber etalon, whereas the long-period filter may be a more expensive bulk-glass etalon or air-gap etalon. Typically, the short-period filter and the long-period filter have different dispersion and temperature characteristics, which may lead to a drift in the relationship between the FSRs of the two filters. Therefore, a tunable laser system including two short-period filters, which may be selected to be the same type of filter and to have matched characteristics, would be more desirable.

Tunable laser systems including two short-period filters having the same FSR, but opposite slopes are described in U.S. Pat. No. 6,359,685, issued on Mar. 19, 2002 to Colbourne, et al., and in U.S. Pat. No. 6,061,124, issued on May 9, 2000 to Nyman, et al., which are incorporated herein by reference. In these tunable laser systems, two series of pulses provided by the two short-period filters are differentially amplified to provide an electrical signal, which is used to encode the laser output of the tunable laser with wavelength information.

SUMMARY OF THE INVENTION

Accordingly, the present invention relates to a tunable laser system having fine and coarse wavelength discrimination, comprising: a first filter, disposed to receive a first portion of a first laser output from a first tunable laser, wherein the first laser output is swept over a first wavelength range, for providing a first series of pulses from the first portion of the first laser output over the first wavelength range, wherein the first filter has a first free spectral range (FSR), such that the pulses in the first series of pulses are separated in wavelength by the first FSR; a second filter, disposed to receive a second portion of the first laser output, for providing a second series of pulses from the second portion of the first laser output over the first wavelength range, wherein the second filter has a second FSR different from the first FSR, such that the pulses in the second series of pulses are separated in wavelength by the second FSR, and wherein the first FSR and the second FSR have a relative difference of less than about 20%; and a processing system for comparing the first series of pulses and the second series of pulses to identify a first series of markers, such that the markers in the first series of markers are separated in wavelength by a beat period of the first series of pulses and the second series of pulses when the first laser output is continuous in wavelength, wherein the first series of pulses provides fine wavelength discrimination and the first series of markers provides coarse wavelength discrimination.

BRIEF DESCRIPTION OF THE DRAWINGS

The present invention will be described in greater detail with reference to the accompanying drawings wherein.

DETAILED DESCRIPTION OF THE INVENTION

The present invention provides a tunable laser system including two short-period filters having different free spectral ranges (FSRs), which may be selected to be the same type of filter and to have matched characteristics. The short-period filters each provide a series of pulses having a short period, and the two series of pulses also have a much longer beat period. Either of the two series of pulses provides fine wavelength discrimination. Moreover, a series of markers, in which the markers are separated by the beat period, provides coarse wavelength discrimination. Advantageously, the series of markers may be used for wavelength referencing and/or for mode-hop detection.

Figure 1:
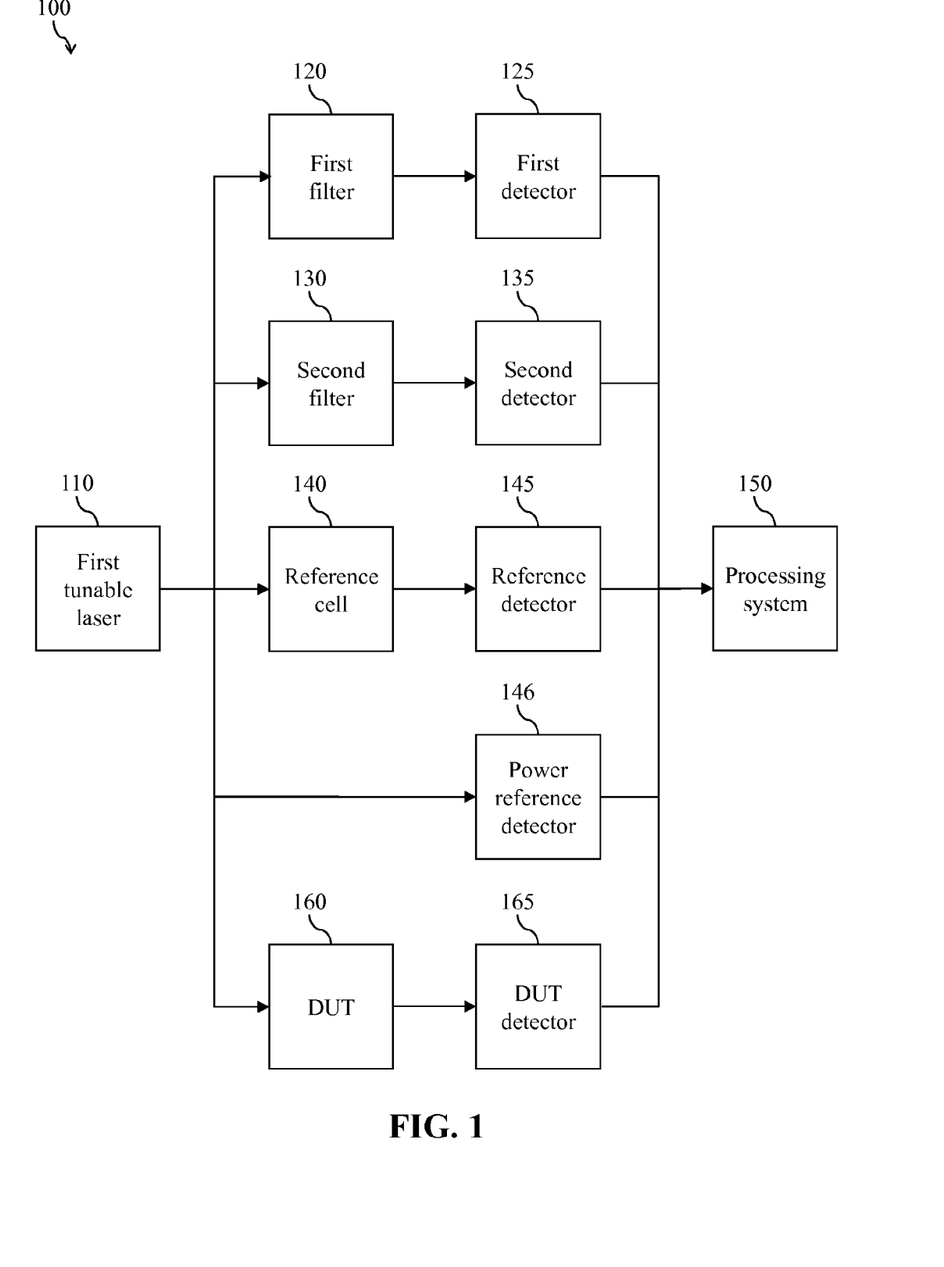
FIG. 1 is a block diagram of a first embodiment of a tunable laser system.

With reference to FIG. 1, a first embodiment of the tunable laser system 100 uses markers for mode-hop detection. The tunable laser system 100 includes a first tunable laser 110, a first filter 120, a first detector 125, a second filter 130, a second detector 135, a reference cell 140, a reference detector 145, a power reference detector 146, and a processing system 150. In some instances, the first tunable laser 110 may be separate from the tunable laser system 100.

In most instances, the tunable laser system 100 is used to test at least one device under test (DUT) 160, and further includes at least one DUT detector 165 and, in some instances, at least one DUT processing system (not shown). Although some embodiments of the tunable laser system 100 may be used to test several different DUTs, e.g., up to 8 DUTs, and/or several different optical ports, e.g., up to 4 optical ports, of the same DUT, for ease of understanding, the use of the tunable laser system 100 to test a single DUT 160 having one optical port is described hereafter. Furthermore, although some embodiments of the tunable laser system 100 may include one or more separate DUT processing systems, for ease of understanding, an embodiment of the tunable laser system 100 including a single processing system 150 is described hereafter.

The first filter 120, the second filter 130, the reference cell 140, the power reference detector 146, and the DUT 160 are each optically coupled to the first tunable laser 110. The first detector 125 is optically coupled to the first filter 120, the second detector 135 is optically coupled to the second filter 130, the reference detector 145 is optically coupled to the reference cell 140, and the DUT detector 165 is optically coupled to the DUT 160. The processing system 150 is electrically coupled to the first detector 125, the second detector 135, the reference detector 145, the power reference detector 146, and the DUT detector 165. Note that other elements typically included in tunable laser systems, such as input devices, e.g., a keyboard or a keypad, power supplies, drive circuitry, and output devices, e.g., a display or a printer, are omitted for simplicity of illustration.

The first tunable laser 110 generates a first laser output that is swept over a first wavelength range, i.e., a first tuning range. For example, the first tunable laser 110 may be an external cavity laser, and the first wavelength range may be of about 1420 nm to about 1520 nm or of about 1520 nm to about 1630 nm. Preferably, the first wavelength range is an entire operating wavelength range of the first tunable laser 110. In each sweep, the wavelength of the first laser output varies as a function of time between a start wavelength and a stop wavelength in the first wavelength range. The wavelength of the first laser output may increase or decrease as a function of time. Typically, the wavelength is varied in response to a tuning signal provided by a tuning circuit.

In general, the wavelength of the first laser output varies continuously over the first wavelength range. However, in some instances, the first tunable laser 110, especially near the end of its life, may undergo one or more mode hops during a sweep. When a mode hop occurs, the wavelength of the first laser output jumps by a wavelength interval that is a function of the cavity length of the first tunable laser 110. Thus, a mode hop of the first tunable laser 110 leads to a wavelength discontinuity in the first laser output. The particular wavelength at which a mode hop occurs depends on several variables and is not predictable. Moreover, the direction of the wavelength jump may be positive or negative.

Typically, the first laser output from the first tunable laser 110 is carried on an optical waveguide, such as an optical fiber, and one or more splitters/combiners or taps are used to divert various portions of the first laser output. Preferably, a major portion, e.g., about 90%, of the first laser output is provided to the DUT 160, and minor portions, e.g., each about 2.5%, of the first laser output are provided to the first filter 120, the second filter 130, the reference cell 140, and the power reference detector 146. The power reference detector 146 is used to correct for wavelength-dependent variations in the optical power of the first laser output as received via any upstream optical components, according to methods well known in the art, and is not described further herein.

The first filter 120, the second filter 130, the reference cell 140, and the DUT 160 are optically coupled to the first tunable laser 110 in parallel, such that the first filter 120 receives a first portion of the first laser output, the second filter 130 receives a second portion of the first laser output, the reference cell 140 receives a third portion of the first laser output, and the DUT 160 receives a fourth portion of the first laser output.

The first filter 120 and the second filter 130 are optical filters. Typically, the first filter 120 and the second filter 130 are multiple-beam interferometers and/or etalons, i.e., Fabry-Perot filters. Preferably, the first filter 120 and the second filter 130 are the same type of filter and have matched characteristics, e.g., dispersion characteristics and/or temperature characteristics. More preferably, the first filter 120 and the second filter 130 are both fiber etalons, which are relatively inexpensive and relatively easy to temperature stabilize.

The first filter 120 and the second filter 130 are both short-period filters. The first filter 120 has a first free spectral range (FSR), and the second filter 130 has a second FSR different from the first FSR. For example, when the first filter 120 and the second filter 130 are etalons, their FSRs, i.e., their wavelength spacings between transmission peaks, are determined according to Equation (1):

$$FSR_\lambda = \frac{\lambda^2}{2nd}, \quad (1)$$

where $\lambda$ is the central wavelength of interest, n is the refractive index of the cavity medium of the etalon, d is the cavity length of the etalon. In some instances, the first filter 120 and the second filter 130 are pre-calibrated in wavelength.

The first FSR of the first filter 120 is small enough to provide the tunable laser system 100 with sufficient wavelength resolution. In other words, the first FSR is less than or equal to a desired wavelength resolution of the tunable laser system 100. The second FSR is nearly identical to the first FSR, but is slightly greater or slightly less than the first FSR. Typically, the first FSR and the second FSR are between about 0.1 pm and about 10 pm, and have a difference of between about 0.01 pm and about 2 pm.

The first FSR and the second FSR have a relative difference of less than about 20%. Preferably, the relative difference is less than about 10%. Although an even smaller relative difference is often preferable, it becomes progressively more expensive to fabricate filters having tightly controlled FSRs. Therefore, the relative difference is, generally, greater than about 1%.

The filter outputs of the first filter 120 and the second filter 130 are series of optical pulses which are periodic in wavelength, i.e., periodic optical signals. The first filter 120 provides a first series of pulses from the first portion of the first laser output over the first wavelength range. The pulses in the first series of pulses are separated in wavelength by the first FSR, i.e., the first series of pulses has a first period equal to the first FSR. Similarly, the second filter 130 provides a second series of pulses from the second portion of the first laser output over the first wavelength range. The pulses in the second series of pulses are separated in wavelength by the second FSR, i.e., the second series of pulses has a second period equal to the second FSR.

Because the first FSR and the second FSR are different, the first series of pulses and the second series of pulses have a beat period. The beat period, $T_b$, is greater than both the first FSR, $FSR_1$, and the second FSR, $FSR_2$, and is determined according to Equation (2):

$$\frac{1}{T_b} = \frac{1}{FSR_1} - \frac{1}{FSR_2}. \quad (2)$$

The beat period is defined by different numbers of pulses in the first series of pulses and the second series of pulses. That is, the first series of pulses and the second series of pulses only beat together, i.e., align in phase or nearly in phase, after different numbers of pulses. Note that the numbers of pulses in the beat period are not necessarily integers.

If the numbers of pulses in the beat period are integers, the first series of pulses and the second series of pulses are synchronized when they beat together. In some instances synchronization of the first series of pulses and the second series of pulses may be desirable to facilitate marker identification, as described in further detail hereafter. However, in most instances, it is impractical to manufacture filters having the precise cavity lengths necessary to achieve synchronization.

In the first embodiment, the beat period is, typically, selected to be greater than a maximum expected mode hop of the first tunable laser 110. Typically, the value of the maximum expected mode hop is empirically predetermined or provided by the laser manufacturer. Preferably, the beat period is selected to be greater than twice the maximum expected mode hop of the first tunable laser 110. For example, if a particular tunable laser is found to typically undergo mode hops of about 10 pm, a beat period of about 30 pm may be selected. Preferably, the beat period is also selected such that a cavity length of the first tunable laser 110 is not an integer multiple of the beat period.

Figure 2:
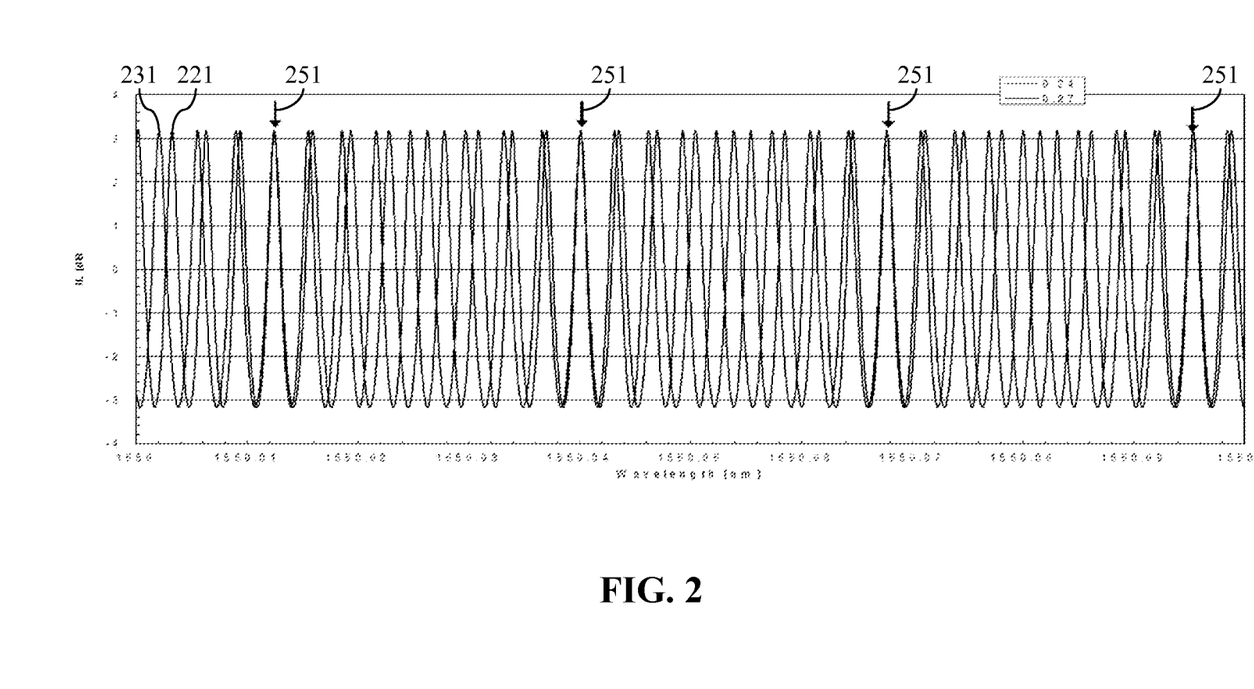
FIG. 2 is a plot of filter outputs for a tunable laser system including two fiber etalons as filters.

For example, filter outputs for a tunable laser system including two fiber etalons as filters are plotted in FIG. 2. A first series of pulses 221 is provided by a first fiber etalon, and a second series of pulses 231 is provided by a second fiber etalon. The first fiber etalon has a first cavity length of 0.27 m and a first FSR of about 3.1 pm. The second fiber etalon has a second cavity length of 0.24 m and a second FSR of about 3.5 pm. Thus, the first FSR and the second FSR have a difference of about 0.4 pm, which is equivalent to a relative difference of about 12%. The first series of pulses 221 and the second series of pulses 231 have a beat period of about 28 pm, which is defined by 9 pulses from the first series of pulses 221 or 8 pulses from the second series of pulses 231. The first series of pulses 221 and the second series of pulses 231 beat together at markers 251, i.e., wavelength points, indicated by arrows in FIG. 2, which are separated by 9 pulses in the first series of pulses 221 and by 8 pulses in the second series of pulses 231.

With reference again to FIG. 1, the reference cell 140 is, typically, a gas absorption cell. The reference cell 140 provides one or more reference lines, typically, absorption lines, having known absolute wavelengths. Accordingly, the reference lines of the reference cell 140 may be used for wavelength referencing.

The DUT 160 is typically an optical component, such as a multiplexer, a switch, a filter, a coupler, a splitter/combiner, an attenuator, an interleaver, a waveguide, or a microelectromechanical system (MEMS) device, including one or more optical ports. The tunable laser system 100 is used to make a wavelength-dependent measurement, such as a loss measurement or a dispersion measurement, on the DUT 160. For example, the tunable laser system 100 may be used to measure insertion loss, polarization dependent loss, return loss, or directivity as a function of wavelength. The DUT 160 provides a DUT output, such as a transmission output or a reflection output, in accordance with the type of measurement.

The first detector 125 receives the first series of pulses, in optical form, from the first filter 120 and detects the first series of pulses. The second detector 135 receives the second series of pulses, in optical form, from the second filter 130 and detects the second series of pulses. The reference detector 145 receives the reference lines, in optical form, from the reference cell 140 and detects the reference lines. The DUT detector 165 receives the DUT output, in optical form, from the DUT 160 and detects the DUT output. Thereby, the first detector 125, the second detector 135, the reference detector 145, and the DUT detector 165 convert the first series of pulses, the second series of pulses, the reference lines, and the DUT output, respectively, from optical to electrical form. In particular, the first series of pulses and the second series of pulses are converted from series of optical pulses to series of electrical pulses, i.e., from periodic optical signals to periodic electrical signals. Typically, the first detector 125, the second detector 135, the reference detector 145, and the DUT detector 165 are photodetectors, e.g., log-amplified photodetectors.

Although a single detector could possibly be used to detect both the first series of pulses and the second series of pulses, if the first series of pulses and the second series of pulses were first combined, marker identification would be more difficult in such an embodiment.

The processing system 150 receives the first series of pulses, the second series of pulses, the reference lines, and the DUT output, in electrical form, from the first detector 125, the second detector 135, the reference detector 145, and the DUT detector 165, respectively, and processes the first series of pulses, the second series of pulses, the reference lines, and the DUT output. In other words, the processing system 150 electronically monitors the detector outputs.

In some instances, the processing system 150 may be an analog processing system including analog circuitry. However, in most instances, the processing system 150 is a digital processing system. When the processing system 150 is a digital processing system, the processing system 150, typically, includes discrete logic circuitry, a programmable logic device, such as a field-programmable gate array (FPGA), or a processor, such as a digital signal processor (DSP) or a general purpose microprocessor. When the processing system 150 includes a processor, some or all of the functions described hereafter may be implemented in software executed by the processor. Typically, the processing system 150 also includes at least one analog-to-digital converter, such as a comparator, and at least one memory.

In most instances, the processing system 150 first digitizes the first series of pulses, the second series of pulses, the reference lines, and the DUT output. The processing system 150 is also configured, through design and/or programming, to perform a variety of functions, depending on the particular embodiment, by using the first series of pulses, the second series of pulses, the reference lines, and/or the DUT output. Although many of these functions could be performed using either the first series of pulses or the second series of pulses, for ease of understanding, the functions are described hereafter as being performed using the first series of pulses.

In the first embodiment, the processing system 150 is configured to perform wavelength referencing by using the first series of pulses and the reference lines, according to methods well known in the art. Typically, wavelength referencing is performed in real time. The processing system 150 compares the first series of pulses and the reference lines to identify a pulse that overlaps in wavelength with an initial reference line, which serves as an absolute wavelength reference. The initial reference line is, generally, the first reference line detected after starting the first tunable laser 110. The processing system 150 then counts the pulses in the first series of pulses starting from the pulse that overlaps with the initial reference line to determine the instantaneous wavelength of the first laser output.

The processing system 150 is further configured to perform wavelength correlation by using the first series of pulses and the DUT output, according to methods well known in the art. Typically, wavelength correlation is performed in real time. The processing system 150 correlates the first series of pulses with the DUT output to provide the instantaneous wavelength of the first laser output at each measurement point in the DUT output. Preferably, interpolation is used to further increase the wavelength resolution.

The processing system 150 is further configured to perform marker identification by using the first series of pulses and the second series of pulses. Typically, marker identification is performed in real time. The processing system 150 compares the first series of pulses and the second series of pulses to identify a first series of markers, which are separated in wavelength by the beat period of the first series of pulses and the second series of pulses when the first laser output is continuous in wavelength. Typically, the markers are identified by detecting a particular relative phase relationship of the first series of pulses and the second series of pulses. Preferably, the markers are identified by detecting a reversal in the relative phase relationship of the first series of pulses and the second series of pulses. In other words, the markers are, preferably, identified by detecting the point in time at which a given edge on one filter goes from leading to lagging, or from lagging to leading, the same edge on the other filter. However, any particular relative phase relationship, and thus any particular wavelength point, may be selected as a marker. Thus, the first series of markers provides coarse wavelength discrimination, whereas the first series of pulses provides fine wavelength discrimination.

Advantageously, the first series of markers may be used for mode-hop detection. During a continuous sweep of the first laser output over the first wavelength range, the numbers of pulses in the first series of pulses between successive markers in the first series of markers should remain constant. In general, a wavelength discontinuity in the first laser output, such as a wavelength discontinuity resulting from a mode hop, will present itself as a change in the number of pulses between successive markers. Thus, a wavelength discontinuity may be detected by making a running comparison of the actual pulse count of the first series of pulses between successive markers in the first series of markers to an expected pulse count or to an allowable range of pulse counts.

In the first embodiment, the processing system 150 is further configured to perform mode-hop detection by using the first series of pulses and the first series of markers. Typically, mode-hop detection is performed in real time. The processing system 150 counts the pulses in the first series of pulses between successive markers in the first series of markers to obtain actual pulse counts. The actual pulse counts are compared either to an expected pulse count or, more usually, to a range of allowable pulse counts including the expected pulse count. Typically, the expected pulse count or the range of allowable pulse counts is stored in memory.

In some instances, the beat period is defined by an integer number of pulses in the first series of pulses, and the markers are separated by the integer number of pulses when the first laser output is continuous in wavelength. In such instances, the integer number of pulses may be used as the expected pulse count. If the actual pulse count is not equal to the expected pulse count, the processing system 150 detects a wavelength discontinuity in the first laser output and determines that the first tunable laser 110 has undergone a mode hop.

For example, with reference to FIG. 2, the markers 251 are separated by exactly 9 pulses in the first series of pulses 221, and 9 could be used as the expected pulse count. If a mode hop of less than the beat period of about 28 pm occurred, the actual pulse count between markers would necessarily differ from the expected pulse count of 9, allowing the wavelength discontinuity to be detected. A mode hop of 10 pm, for example, could result in a pulse count of 6 or 12, if the mode hop occurred between two markers, or possibly in a pulse count of 15 or 3, if the mode hop occurred across a marker.

However, in most instances, the beat period is defined by a non-integer number of pulses in the first series of pulses, and the markers are separated by the non-integer number of pulses when the first laser output is continuous in wavelength. In such instances, a range including the non-integer number of pulses is used as the allowable range of pulse counts. If the actual pulse count is outside the allowable range of pulse counts, the processing system 150 detects a wavelength discontinuity in the first laser output and determines that the first tunable laser 110 has undergone a mode hop. For example, if the markers are separated by approximately 10 pulses, e.g., 10.2 pulses, in the first series of pulses, 9-11 could be used as an allowable range of pulse counts.

When a wavelength discontinuity is detected, the processing system 150, typically, reports the occurrence of a mode hop to a user via an output device, such as a display. The mode hop may be reported immediately or at the end of a scan of the DUT 160. For example, an entire scan or a portion of a scan including a wavelength discontinuity may be flagged as invalid.

In some instances, when the wavelength discontinuity resulting from a mode hop is well characterized, the first series of markers may also be used for wavelength referencing after the wavelength discontinuity, as described in further detail hereafter. In such instances, the first filter 120 and the second filter 130 are pre-calibrated in wavelength, so that the marker wavelengths are predetermined, i.e., the first series of markers is effectively pre-calibrated in wavelength. After the wavelength discontinuity is detected, the processing system 150 identifies the next marker in the first series of markers, which serves as an absolute wavelength reference. The next marker is the first marker identified after the wavelength discontinuity is detected. The processing system 150 then resumes counting the pulses in the first series of pulses starting from the next marker to determine the instantaneous wavelength of first laser output.

Figure 3:
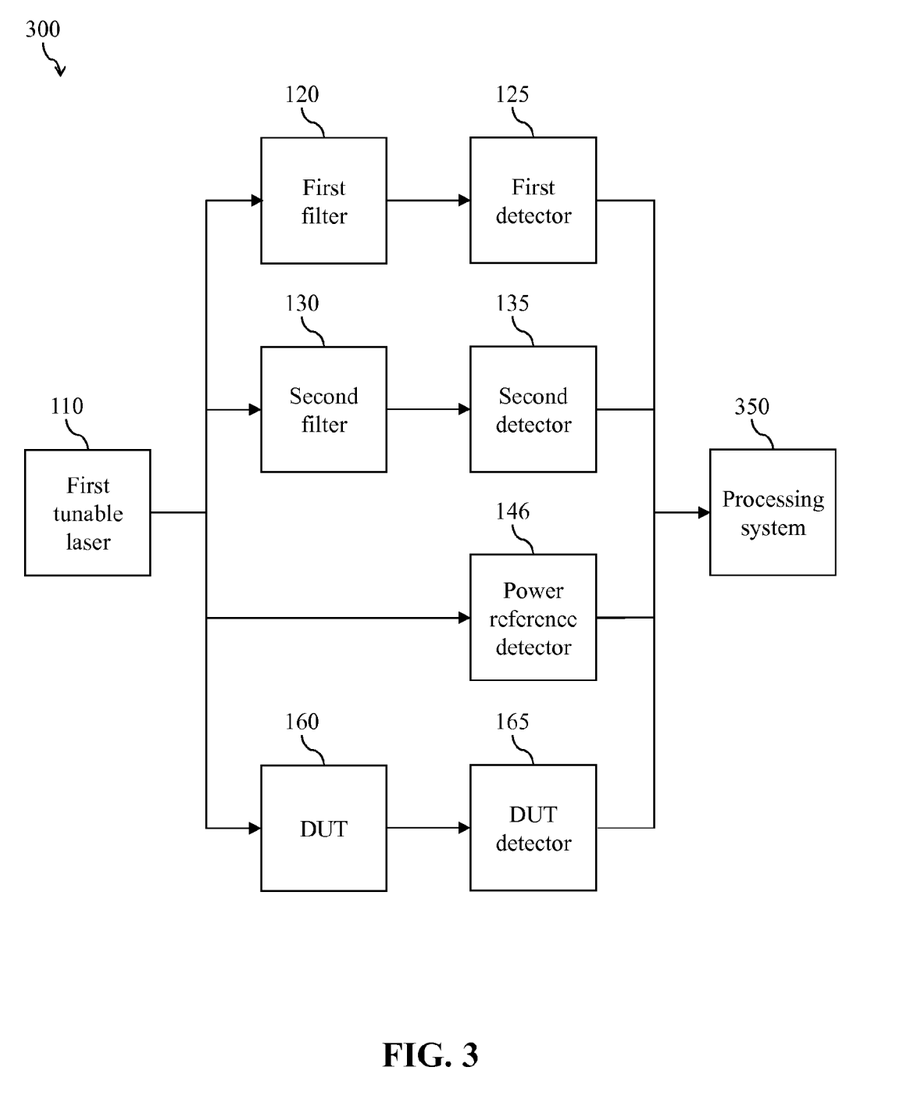
FIG. 3 is a block diagram of a second embodiment of a tunable laser system.

With reference to FIG. 3, a second embodiment of the tunable laser system 300 uses markers for wavelength referencing. The second embodiment of the tunable laser system 300 is similar to the first embodiment of the tunable laser system 100, but includes a differently configured processing system 350 and does not include the reference cell 140 or the reference detector 145. Aspects of the second embodiment that are different from the first embodiment are described in further detail hereafter In the second embodiment, the first filter 120 and the second filter 130 are pre-calibrated in wavelength, so that the marker wavelengths are predetermined, i.e., the first series of markers is effectively pre-calibrated in wavelength. Furthermore, the beat period, which separates the markers in the first series of markers, is selected to be greater than an uncertainty range of a start wavelength of the first laser output, which determined by the starting wavelength accuracy of the first tunable laser 110. Typically, the value of the starting wavelength accuracy is empirically predetermined or provided by the laser manufacturer. For example, if the uncertainty range of the start wavelength of a particular tunable laser is 20 pm, i.e., ±10 pm, a beat period of 30 pm may be selected. Preferably, the beat period is selected to be greater than twice the uncertainty range of the start wavelength of the first laser output.

Accordingly and advantageously, the first series of markers may be used for wavelength referencing, in place of the reference lines of a reference cell. Provided that a constant temperature is maintained, the predetermined marker wavelengths will remain constant and may be considered as absolute wavelengths.

In the second embodiment, the first tunable laser 110 is started at a start wavelength between two predetermined marker wavelengths. Because the starting wavelength accuracy of the first tunable laser 110 is, generally, relatively low, the start wavelength is only known with a relatively large uncertainty range. However, once an initial marker is identified as the first laser output is swept, the instantaneous wavelength is known with a much smaller uncertainty range, e.g., less than ±0.2 pm. Typically, the start wavelength is selected to ensure that the uncertainty range of the start wavelength is entirely contained between two predetermined marker wavelengths. Preferably, the start wavelength is a midpoint between two predetermined marker wavelengths. Since the first series of markers is periodic in wavelength, a series of possible start wavelengths are available throughout the operating wavelength range of the first tunable laser 110.

In the second embodiment, the processing system 350 is configured to perform wavelength referencing of the first wavelength range by using the first series of pulses and the first series of markers, rather than the reference lines of a reference cell. Typically, wavelength referencing is performed in real time. The processing system 350 identifies the initial marker in the first series of markers, which serves as an absolute wavelength reference. The initial marker is the first marker identified after starting the first tunable laser 110, i.e., the first marker identified in the first wavelength range. The processing system 350 then counts the pulses in the first series of pulses starting from the initial marker to determine the instantaneous wavelength of the first laser output.

In the second embodiment, the processing system 350 may or may not be further configured to perform mode-hop detection by using the first series of pulses and the first series of markers, as described heretofore. Whether mode-hop detection is implemented depends on the likelihood of mode hops occurring, which is determined by the type of tunable laser and the particular wavelength range of the sweep.

Figure 4:
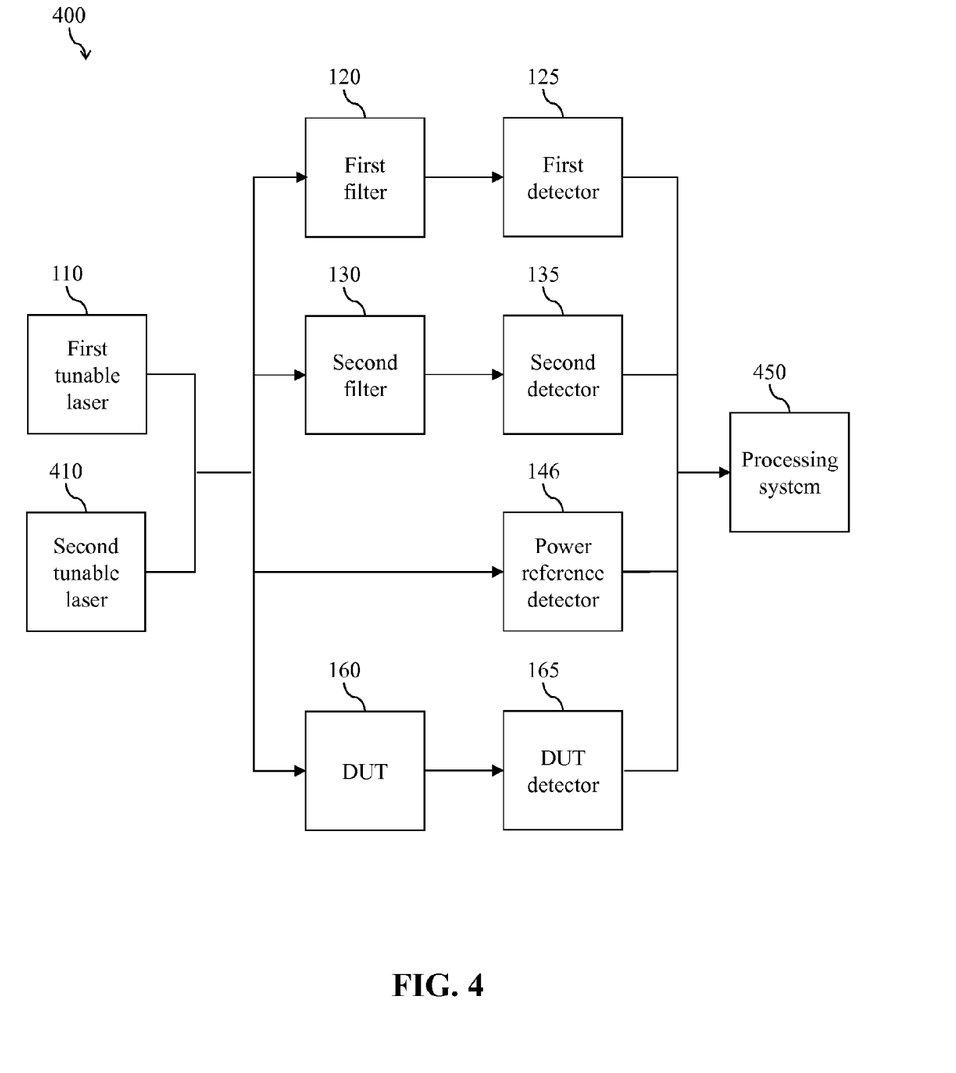
FIG. 4 is a block diagram of a third embodiment of a tunable laser system.

With reference to FIG. 4, a third embodiment of the tunable laser system 400 uses markers for wavelength referencing of multiple wavelength ranges. The third embodiment of the tunable laser system 400 is similar to the second embodiment of the tunable laser system 300, but includes a second tunable laser 410, in addition to the first tunable laser 110, and a differently configured processing system 450. Aspects of the third embodiment that are different from the second embodiment are described in further detail hereafter.

In the third embodiment, the first filter 120, the second filter 130, and the DUT 160 are each optically coupled to the second tunable laser 410, as well as the first tunable laser 110. The first tunable laser 110 and the second tunable laser 410 are, typically, connected to the tunable laser system 100 by using a combination of wavelength-division multiplexers (WDMs) and splitters/combiners to avoid unnecessary optical power loss. Alternatively, the first tunable laser 110 and the second tunable laser 410 may be connected through a multiport optical switch, such that only one tunable laser is connected at a time.

The second tunable laser 410 generates a second laser output that is swept over a second wavelength range, which partially overlaps with the first wavelength range of the first laser output generated by the first tunable laser 110. The first tunable laser 110 and the second tunable laser 410 may be the same type of tunable laser or may be different types of tunable laser. Generally, the first tunable laser 110 and the second tunable laser 410 have different operating wavelength ranges. Although, for ease of understanding, a tunable laser system 400 including two tunable lasers 110 and 410 is described, a larger number of tunable lasers could also be used. In general, a plurality of tunable lasers sweep through multiple partially overlapping wavelength ranges.

In the third embodiment, in addition to providing the first series of pulses from the first portion of the first laser output over the first wavelength range, the first filter 120 provides a third series of pulses from the first portion of the second laser output over the second wavelength range. The pulses in the third series of pulses, like those in the first series of pulses, are separated in wavelength by the first FSR. In addition to providing the second series of pulses from the second portion of the first laser output over the first wavelength range, the second filter 130 provides a fourth series of pulses from the second portion of the second laser output over the second wavelength range. The pulses in the fourth series of pulses, like those in the second series of pulses, are separated in wavelength by the second FSR. Thus, the third series of pulses and the fourth series of pulses have the same beat period as the first series of pulses and the second series of pulses.

The first detector 125 receives the third series of pulses, in optical form, from the first filter 120 and detects the third series of pulses. The second detector 135 receives the fourth series of pulses, in optical form, from the second filter 130 and detects the fourth series of pulses. Thereby, the first detector 125 and the second detector 135 convert the third series of pulses and the fourth series of pulses from optical to electrical form.

The processing system 450 receives the third series of pulses and the fourth series of pulses from the first detector 125 and the second detector 135, respectively, and processes the third series of pulses and the fourth series of pulses. In most instances, the processing system 450 first digitizes the third series of pulses and the fourth series of pulses.

In the third embodiment, the processing system 450 is configured to perform marker identification by using the third series of pulses and the fourth series of pulses, as well as the first series of pulses and the second series of pulses. In addition to comparing the first series of pulses and the second series of pulses to identify the first series of markers, the processing system 450 compares the third series of pulses and the fourth series of pulses to identify a second series of markers. Both the first series of markers and the second series of markers are separated in wavelength by the same beat period when the first laser output and the second laser output are continuous in wavelength.

Advantageously, the series of markers provide not only the initial marker for each wavelength range, but also provide common markers at which the wavelength ranges may be combined. This capability removes the requirement for a single tunable laser that sweeps continuously through an entire operating wavelength range, enabling the use of other types of tunable laser, which may be faster and/or less expensive. For example, a plurality of tunable lasers that sweep through multiple wavelength ranges covering the operating wavelength range may be used. Alternatively, as described in further detail below, a single tunable laser that sweeps non-continuously through the operating wavelength range may be used.

In the third embodiment, the processing system 450 is further configured to perform wavelength referencing of the second wavelength range by using the first series of pulses and the second series of markers, in addition to wavelength referencing of the first wavelength range. Typically, wavelength referencing is performed in real time. The processing system 450 identifies the initial marker in the second series of markers, which serves as an absolute wavelength reference. The initial marker is the first marker identified after starting the second tunable laser 410, i.e., the first marker identified in the second wavelength range. The processing system 450 then counts the pulses in the third series of pulses starting from the initial marker to determine the instantaneous wavelength of the second laser output 410.

Figure 5:
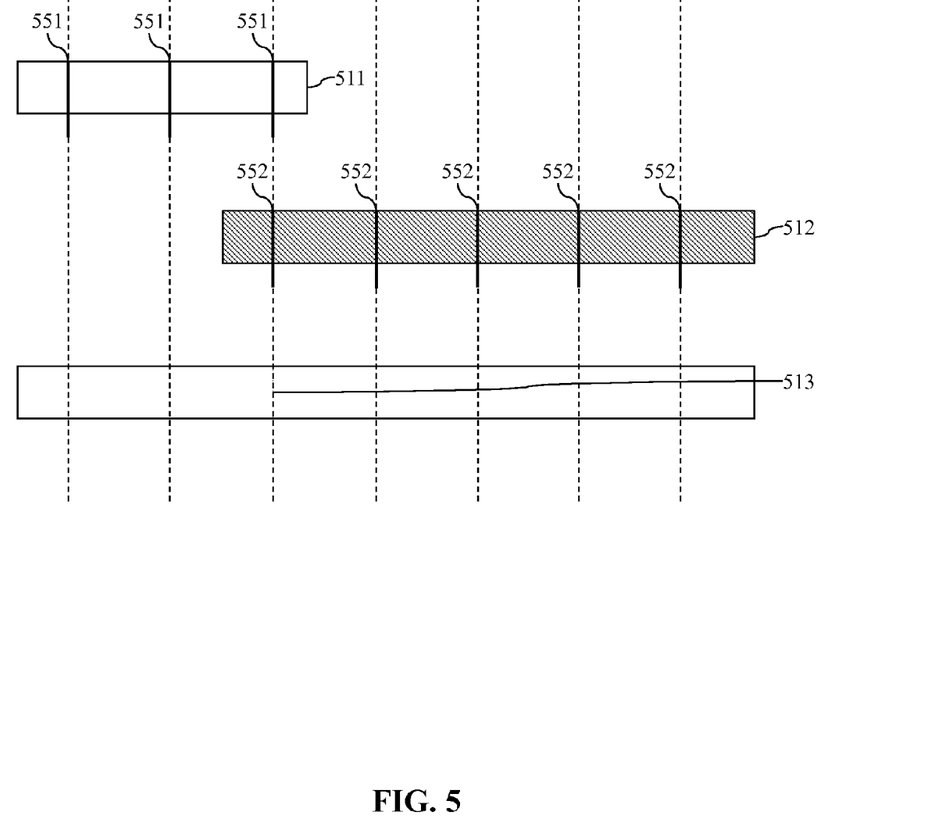
FIG. 5 is a schematic illustration of a combination of a first wavelength range and a second wavelength range to provide a combined wavelength range.

With reference to FIG. 5, the processing system 450 then compares the first series of markers 551 and the second series of markers 552 to identify common markers having the same wavelength. Typically, the processing system 450 identifies a marker in the first series of markers 551 having the same wavelength as the initial marker in the second series of markers 552 and/or a marker in the second series of markers 552 having the same wavelength as a final marker in the first series of markers 551. The processing system 450 combines, i.e., merges or stitches together, the first wavelength range 511 and the second wavelength range 512 at the common markers, and removes overlapping portions of the first wavelength range 511 and the second wavelength range 512 to provide a combined wavelength range 513, which is larger than the first wavelength range 511 and the second wavelength range 512.

Thus, with reference again to FIG. 4, multiple sub-scans of the DUT 160, each over a smaller wavelength range, may be combined to provide a scan of the DUT 160 over a larger wavelength range. Typically, such a combination of sub-scans is performed in post-processing. The processing system 450, typically, presents the scan of the DUT 160 and, in some instances, the sub-scans of the DUT 160 to the user via an output device, such as a display.

With reference again to FIG. 3, a variation of the second embodiment of the tunable laser system 300, which includes a single non-continuous first tunable laser 110, also uses markers for wavelength referencing of multiple wavelength ranges. The variation of the second embodiment of the tunable laser system 300 is similar to the third embodiment of the tunable laser system 400, but does not include the second tunable laser 410. Aspects of the variation of the second embodiment that are different from the second embodiment and the third embodiment are described in further detail hereafter.

In the variation of the second embodiment, the first tunable laser 110 generates a non-continuous first laser output that is swept over at least a first wavelength range and a second wavelength range, which partially overlaps with the first wavelength range. Although, for ease of understanding, a first laser output swept over two wavelength ranges is described, the first laser output could also be swept over a larger number of wavelength ranges. In general, the first tunable laser 110 sweeps through its operating wavelength range in multiple partially overlapping wavelength ranges, rather than in one continuous sweep.

In the variation of the second embodiment, in addition to providing the first series of pulses from the first portion of the first laser output over the first wavelength range, the first filter 120 provides a third series of pulses from the first portion of the first laser output over the second wavelength range. In addition to providing the second series of pulses from the second portion of the first laser output over the first wavelength range, the second filter 130 provides a fourth series of pulses from the second portion of the first laser output over the second wavelength range. As described heretofore, the processing system 350 compares the third series of pulses and the fourth series of pulses to identify a second series of markers.

In the variation of the second embodiment, the processing system 350, as described heretofore, counts the pulses in the first series of pulses starting from the initial marker in the first series of markers, which is the first marker identified in the first wavelength range, to determine the instantaneous wavelength of the first laser output in the first wavelength range. The processing system 350 also counts the pulses in the third series of pulses starting from an initial marker in the second series of markers, which is the first marker identified in the second wavelength range, to determine the instantaneous wavelength of the first laser output in the second wavelength range. The processing system 350 then compares the first series of markers and the second series of markers to identify common markers having the same wavelength, and combines the first wavelength range and the second wavelength range at the common markers to provide a combined wavelength range, as described heretofore.

Of course, numerous other embodiments may be envisaged without departing from the spirit and scope of the invention.

We claim:

1. A tunable laser system having fine and coarse wavelength discrimination, comprising:
   a first filter, disposed to receive a first portion of a first laser output from a first tunable laser, wherein the first laser output is swept over a first wavelength range, for providing a first series of pulses from the first portion of the first laser output over the first wavelength range, wherein the first filter has a first free spectral range (FSR), such that the pulses in the first series of pulses are separated in wavelength by the first FSR;
   a second filter, disposed to receive a second portion of the first laser output, for providing a second series of pulses from the second portion of the first laser output over the first wavelength range, wherein the second filter has a second FSR different from the first FSR, such that the pulses in the second series of pulses are separated in wavelength by the second FSR, and wherein the first FSR and the second FSR have a relative difference of less than about 20%; and
   a processing system for comparing the first series of pulses and the second series of pulses to identify a first series of markers, such that the markers in the first series of markers are separated in wavelength by a beat period of the first series of pulses and the second series of pulses when the first laser output is continuous in wavelength, wherein the first series of pulses provides fine wavelength discrimination and the first series of markers provides coarse wavelength discrimination.

2. The tunable laser system of claim 1, further comprising: the first tunable laser for generating the first laser output.

3. The tunable laser system of claim 1, further comprising:
   a first detector, disposed to receive the first series of pulses, for detecting the first series of pulses; and
   a second detector, disposed to receive the second series of pulses, for detecting the second series of pulses;
   wherein the processing system is electrically coupled to the first detector and the second detector.

4. The tunable laser system of claim 1, wherein the first filter and the second filter are a same type of filter and have matched characteristics.

5. The tunable laser system of claim 4, wherein the first filter and the second filter are fiber etalons.

6. The tunable laser system of claim 1, wherein the first FSR is less than or equal to a desired wavelength resolution of the tunable laser system.

7. The tunable laser system of claim 1, wherein the relative difference of the first FSR and the second FSR is greater than about 1%.

8. The tunable laser system of claim 1, wherein the processing system identifies the first series of markers by detecting a particular relative phase relationship of the first series of pulses and the second series of pulses.

9. The tunable laser system of claim 1, wherein the processing system identifies the first series of markers by detecting a reversal in a relative phase relationship of the first series of pulses and the second series of pulses.

10. The processing system of claim 1, wherein the processing system is also for counting the pulses in the first series of pulses between successive markers in the first series of markers to detect a wavelength discontinuity in the first laser output.

11. The tunable laser system of claim 10, wherein the wavelength discontinuity results from a mode hop of the first tunable laser, and wherein the beat period is greater than a maximum expected mode hop of the first tunable laser.

12. The tunable laser system of claim 10, wherein the wavelength discontinuity results from a mode hop of the first tunable laser, and wherein the first tunable laser has a cavity length that is not an integer multiple of the beat period.

13. The tunable laser system of claim 10, wherein the processing system detects the wavelength discontinuity by comparing actual pulse counts between successive markers in the first series of markers to an allowable range of pulse counts.

14. The tunable laser system of claim 10, wherein the processing system is also for, after the wavelength discontinuity is detected, counting the pulses in the first series of pulses starting from a next marker in the first series of markers to determine an instantaneous wavelength of the first laser output, wherein the next marker is the first marker identified after the wavelength discontinuity is detected.

15. The tunable laser system of claim 1, wherein the processing system is also for counting the pulses in the first series of pulses starting from an initial marker in the first series of markers to determine an instantaneous wavelength of the first laser output.

16. The tunable laser system of claim 15, wherein the beat period is greater than an uncertainty range of a start wavelength of the first laser output, and wherein the initial marker is the first marker identified after starting the first tunable laser.

17. The tunable laser system of claim 15, further comprising:
   a device under test (DUT), disposed to receive a third portion of the first laser output, for providing a DUT output from the third portion of the first laser output over the first wavelength range;
   wherein the processing system is also for correlating the first series of pulses with the DUT output to provide the instantaneous wavelength of the first laser output at each measurement point in the DUT output.

18. The tunable laser system of claim 1, wherein the first filter is also disposed to receive a first portion of a second laser output from a second tunable laser, wherein the second laser output is swept over a second wavelength range partially overlapping with the first wavelength range, and is also for providing a third series of pulses from the first portion of the second laser output over the second wavelength range, such that the pulses in the third series of pulses are separated in wavelength by the first FSR;
   wherein the second filter is also disposed to receive a second portion of the second laser output, and is also for generating a fourth series of pulses from the second portion of the second laser output over the second wavelength range, such that the pulses in the fourth series of pulses are separated in wavelength by the second FSR; and
   wherein the processing system is also for comparing the third series of pulses and the fourth series of pulses to identify a second series of markers, such that the markers in the second series of markers are separated in wavelength by the beat period when the second laser output is continuous in wavelength, for comparing the first series of markers and the second series of markers to identify common markers having a same wavelength, and for combining the first wavelength range and the second wavelength range at the common markers to provide a combined wavelength range.

19. The tunable laser system of claim 18, further comprising:
   the second tunable laser for generating the second laser output.

20. The tunable laser system of claim 18, wherein the processing system is also for counting the pulses in the first series of pulses starting from an initial marker in the first series of markers to determine an instantaneous wavelength of the first laser output, and for counting the pulses in the third series of pulses starting from an initial marker in the second series of markers to determine an instantaneous wavelength of the second laser output.

21. The tunable laser system of claim 1, wherein the first laser output is also swept over a second wavelength range partially overlapping with the first wavelength range;
  wherein the first filter is also for providing a third series of pulses from the first portion of the first laser output over the second wavelength range, such that pulses in the third series of pulses are separated in wavelength by the first FSR;
  wherein the second filter is also for providing a fourth series of pulses from the second portion of the first laser output over the second wavelength range, such that pulses in the fourth series of pulses are separated in wavelength by the second FSR; and
  wherein the processing system is also for comparing the third series of pulses and the fourth series of pulses to identify a second series of markers, such that the markers in the second series of markers are separated in wavelength by the beat period when the first laser output is continuous in wavelength, for comparing the first series of markers and the second series of markers to identify common markers having a same wavelength, and for combining the first wavelength range and the second wavelength range at the common markers to provide a combined wavelength range.

22. The tunable laser system of claim 21, wherein the processing system is also for counting the pulses in the first series of pulses starting from an initial marker in the first series of markers to determine an instantaneous wavelength of the first laser output in the first wavelength range, and for counting the pulses in the third series of pulses starting from an initial marker in the second series of markers to determine an instantaneous wavelength of the first laser output in the second wavelength range.

* * * * *